United States Patent
Storz et al.

(10) Patent No.: US 7,002,717 B1
(45) Date of Patent: Feb. 21, 2006

(54) APPARATUS FOR BEAM DEFLECTION

(75) Inventors: Rafael Storz, Heidelberg (DE); Johann Engelhardt, Bad Schoenborn (DE); Holger Birk, Meckesheim (DE); Joachim Bradl, Schriesheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1355 days.

(21) Appl. No.: 09/681,014

(22) Filed: Nov. 20, 2000

(30) Foreign Application Priority Data

Nov. 24, 1999 (DE) .............................. 199 56 439

(51) Int. Cl.
*G02B 26/08* (2006.01)
(52) U.S. Cl. ..................... 359/201; 359/198; 359/200; 359/203
(58) Field of Classification Search ................ 359/203, 359/201
See application file for complete search history.

(56) References Cited

U.S. PATENT DOCUMENTS

| 5,225,923 A | 7/1993 | Montagu | ..................... 359/199 |
| 5,408,352 A * | 4/1995 | Peng | .......................... 359/203 |

FOREIGN PATENT DOCUMENTS

| DE | 43 22 694 A 1 | 7/1993 |
| DE | 196 54 210 A 1 | 12/1996 |
| WO | WO 98/28640 | 7/1998 |

* cited by examiner

*Primary Examiner*—James Phan
(74) *Attorney, Agent, or Firm*—Houston Eliseeva LLP

(57) ABSTRACT

The invention concerns an apparatus for beam deflection, in particular for scanning microscopy, a light beam being deflectable by a mirror arrangement that is alternatingly rotatable by a rotary drive. The apparatus for beam deflection makes possible maximum variability in terms of frequency range and maximally achievable oscillation frequency, and is thus usable in flexible and versatile fashion. It moreover allows almost any desired angular offset from the zero point position to be established, and is characterized in that the rotary drive comprises two mutually independent drive units which rotate the mirror arrangement, together or mutually independently, about a rotation axis.

30 Claims, 2 Drawing Sheets

APPARATUS FOR BEAM DEFLECTION

CROSS REFERENCE TO RELATED APPLICATIONS

This invention claims priority of a German patent application DE 199 56 439.6 which is incorporated by reference herein.

BACKGROUND OF INVENTION

The present invention concerns an apparatus for beam deflection, in particular for scanning microscopy, the light being deflectable by a first mirror arrangement that is alternatingly rotatable by a rotary drive. Apparatuses of the generic type are used in particular in scanning microscopy, in particular in confocal laser scanning microscopy. Merely by way of example, reference is made to DE 43 22 694 A1, in which a light beam is deflected with the aid of at least three mirrors, each having its own rotary drive.

DE 196 54 210 A1 discloses, per se, an optical arrangement for scanning a beam in two axes lying substantially perpendicular to one another, said arrangement having two rotationally driven mirrors, one of the two mirrors having a further mirror nonrotatably associated with it in a predefined angular position.

The mechanical rotary drives used for the mirrors or first mirror arrangements of the existing art are usually conventional galvanometers or resonant galvanometers. Galvanometers can be operated over a wide frequency range and are therefore versatile in terms of their utilization capabilities. With suitable activation, the zero point position of the galvanometer can be given an angular offset which corresponds to a constant deflection of the galvanometer axis. Because of their large moment of inertia, however, these galvanometers have an upper limit of a few hundred Hz in terms of their maximum attainable pivoting frequency or oscillation frequency. In addition, in some circumstances it is possible for undesirable oscillation-frequency-related deviations in the activation signal of a galvanometer (reference position) with respect to the actually established angular or rotational position of the mirror (actual position) to occur.

Resonant galvanometers, on the other hand, have a very high pivoting frequency or oscillation frequency, and the deviation between reference position and actual position is generally smaller than with conventional galvanometers. Resonant galvanometers can be operated only at the corresponding resonant frequency, however, so that versatile utilization is not possible. In addition, it is not possible with resonant galvanometers to establish an angular offset from the zero point position.

SUMMARY OF INVENTION

It is therefore the object of the present invention to describe an apparatus for beam deflection that allows maximum variability in terms of frequency range and maximum attainable oscillation frequency, so as thereby to create flexible and versatile utilization capabilities. The apparatus is moreover intended to be able to establish essentially any desired angular offset from the zero point position.

The aforesaid object is achieved by an apparatus which comprises: a first mirror arrangement for deflecting a light beam; and a rotary drive for alternatingly rotating the first mirror arrangement, wherein the rotary drive has two mutually independent drive units for rotating the first mirror arrangement, together or mutually independently, about a rotation axis defined by said rotary drive.

It is a further the object of the present invention to describe scanning microscope which allows maximum variability in terms of frequency range and maximum attainable oscillation frequency, so as thereby to create flexible and versatile utilization capabilities. The scanning microscope is moreover intended to be able to establish essentially any desired angular offset from the zero point position.

The aforesaid object is achieved by a scanning microscope which comprises: an apparatus for beam deflection, wherein the apparatus for beam deflection has a first mirror arrangement for deflecting a light beam; and a rotary drive for alternatingly rotating the first mirror arrangement, wherein the rotary drive has two mutually independent drive units for rotating the first mirror arrangement, together or mutually independently, about a rotation axis defined by said rotary drive.

What has been recognized according to the present invention is firstly that resonant galvanometers are typically of high mechanical quality. In the context of an alternating rotation of a resonant galvanometer at oscillation frequencies that are far below the resonant frequency, this makes possible a direct transfer, without dephasing, to a mirror that is, for example, attached to the resonant galvanometer.

A rotary drive that comprises two mutually independent drive units combines the characteristic properties of the two drive units. The advantage of variable and flexible utilization of the apparatus according to the present invention outweighs the disadvantage of the need for two drive units per rotation axis.

The two drive units could be embodied as galvanometers or as stepping motors. The combination of one galvanometer with one stepping motor for both drive units is also possible.

The two drive units are combined with one another in such a way that their rotation axes are substantially parallel to one another. In particular, the drive units can be combined with one another in such a way that their rotation axes coincide or are substantially identical.

In terms of a concrete embodiment, the second drive unit is mounted on the shaft of the first drive unit so that the second drive unit can be rotated by the first drive unit. In this case, for example, the first drive unit could be mounted in stationary fashion on a microscope housing, so that when the first drive unit is operated, its shaft performs an alternating rotation or pivoting movement, and rotates or pivots the second drive unit. The shaft of the first drive unit could be joined to the second drive unit either immovably or rigidly, or flexibly, for example via a linkage.

The second mirror arrangement is mounted on the shaft of the second drive unit. For that purpose, the second mirror arrangement could either be directly adhesively bonded onto the shaft of the second drive unit, or attached thereon with a corresponding mechanical apparatus.

In a preferred embodiment, the second drive unit is embodied as a resonant galvanometer. When this resonant galvanometer is in operation, beam deflection is then possible at only one frequency, namely at the resonant frequency of the resonant galvanometer. In the event this resonant frequency is substantially greater than the maximum attainable oscillation frequency of the first drive unit, fast beam deflection is preferably accomplished with the second drive unit.

In the interest of precise and accurate beam deflection and, above all, to prevent vibration transfers between the two drive units, it may be necessary for the shaft of the first drive unit to be nonrotatable during operation of the second drive unit. This can be achieved either by way of corresponding control-engineering actions on the drive units themselves or, for example, by way of an additional mechanical apparatus. It must ultimately be possible, when the one drive unit alone is operated, for no undesired relative motion to occur between the two drive units.

In a further embodiment, what is selected as the first drive unit is a galvanometer or a stepping motor with which preferably a slow beam deflection is accomplished. Since the galvanometer or stepping motor alternatingly rotates the second drive unit plus mirror arrangement as the result of a direct or indirect coupling with the first drive unit, an upper limit is in any case placed on the oscillation frequency because of the large moment of inertia of the elements being moved.

It may be also necessary for the shaft of the second drive unit to be stationary during operation of the first drive unit. It must ultimately be possible, when the first drive unit alone is in operation, for its alternating rotation to be transferred directly and immediately via the second drive unit to the mirror arrangement.

In the instance in which a galvanometer or a stepping motor is used as the first drive unit, a beam deflection offset or angular offset can be established with the first drive unit. This can be accomplished with the control unit of the galvanometer or stepping motor in the usual way, by making available a different offset current to the galvanometer or by displacing the shaft of the stepping motor into the corresponding angular position.

In particularly advantageous fashion, for deflection of the light beam in a further deflection direction, the first mirror arrangement could be preceded or followed by a second mirror arrangement that can be alternatingly rotated with a second rotary drive. The combination of the apparatus according to the present invention for beam deflection with a further apparatus for beam deflection then makes possible beam deflection in two mutually independent directions. Deflections in further deflection directions with additional mirror arrangements would also be conceivable.

The rotary drive of the second mirror arrangement could in turn comprise two mutually independent drive units which rotate the second mirror arrangement together or mutually independently about a rotation axis, to which what has been stated previously applies. The second rotary drive could also be embodied simply as a galvanometer or stepping motor. In particular, the second rotary drive could be embodied as a resonant galvanometer.

In a concrete embodiment, the two apparatuses for beam deflection are arranged in such a way that the deflection direction of the first mirror arrangement is substantially perpendicular to the deflection direction of the second mirror arrangement. This makes possible, in particular for confocal laser scanning microscopy, a planar scanning movement of the light beam being scanned.

When the two apparatuses for beam deflection or the two mirror arrangements are in operation, the apparatus for beam deflection arranged as the first mirror arrangement in the illumination beam path could execute a slow beam deflection, and the second mirror arrangement arranged in the illumination beam path could execute a fast beam deflection. A fast beam deflection by the first mirror arrangement in conjunction with a slow beam deflection by the second mirror arrangement can also be advisable. It is further conceivable for each of the two mirror arrangements to execute a slow or a fast beam deflection. A "fast" beam deflection is understood in this context as an oscillation frequency lying in the range from 100 Hz to 10,000 Hz. A "slow" beam deflection lies in the range from 0.1 Hz to 800 Hz.

In a preferred embodiment, one of the two mirror arrangements has at least two mirrors, which are received in a shared mount and are associated nonrotatably with respect to one another in a predefined angular position. It is also conceivable for each of the two mirror arrangements to have at least two mirrors which are received in a shared mount. It is also possible for one or both mirror arrangements to have exactly one mirror.

To minimize distortion errors, one of the two mirrors could be arranged as a paddle scanner. In particular, the mirror arranged first in the illumination beam path could be embodied as a paddle scanner. This achieves, approximately, rotation of the beam about a virtual rotation point, which advantageously makes possible the use of small mirror surfaces. In addition, distortion errors that are induced by beam deflection can be greatly minimized.

BRIEF DESCRIPTION OF DRAWINGS

There are various ways of advantageously embodying and developing the teaching of the present invention. Reference is made, for that purpose, on the one hand to the claims which follow claim 1, and on the other hand to the explanation below of exemplary embodiments of the invention with reference to the drawings. In conjunction with the explanation of preferred exemplary embodiments of the invention with reference to the drawings, a general explanation is also given of preferred embodiments and developments of the teaching. In the drawings:

DETAILED DESCRIPTION

Figure 1:
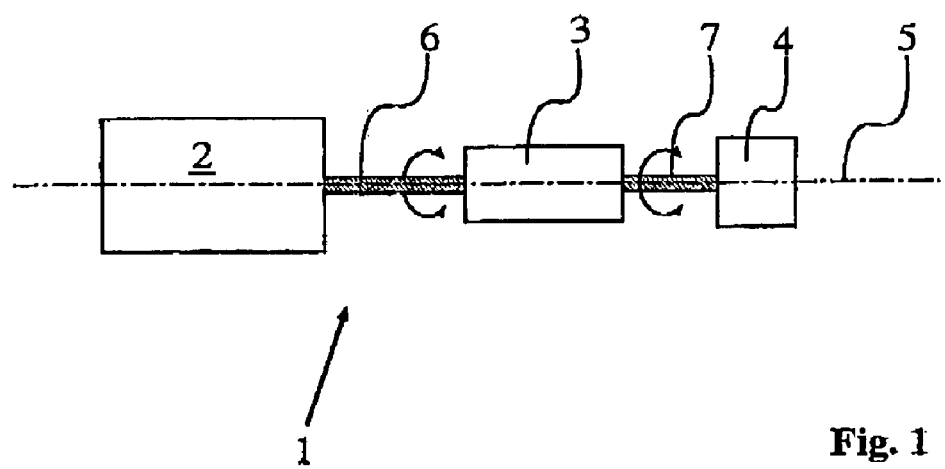
FIG. 1 shows, in a schematic depiction, a first exemplary embodiment of an apparatus for beam deflection according to the present invention.

FIG. 1 shows an apparatus for beam deflection for confocal laser scanning microscopy, in which rotary drive 1 comprises two mutually independent drive units 2, 3. The two drive units (2, 3) are embodied as galvanometers and/or as stepping motors and rotate mirror 4, together or mutually independently, about a rotation axis 5. The rotation axes of the two drive units 2, 3 are identical, and are drawn with a dot-dash line labeled 5 in FIG. 1.

Second drive unit 3 is mounted on shaft 6 of first drive unit 2. Second drive unit 3 can be rotated by first drive unit 2. Mirror 4 is mounted on shaft 7 of second drive unit 3. Drive unit 3 is embodied as a resonant galvanometer with which a fast beam deflection is accomplished. The arrangement ensures, in particular, that shaft 6 of galvanometer 2 is held nonrotatably when resonant galvanometer 3 is in operation.

A slow beam deflection is performed with galvanometer 2, the arrangement ensuring that shaft 7 of resonant galvanometer 3 is nonrotatable during operation of galvanometer 2. This results principally from the aforementioned high mechanical quality of resonant galvanometers, which transfer vibration to mirror 4 directly and without dephasing. Galvanometer 2 can be used to establish a beam deflection offset; the alternating rotary motions of the mirror arrangement are then performed about this new angular position.

Figure 2:
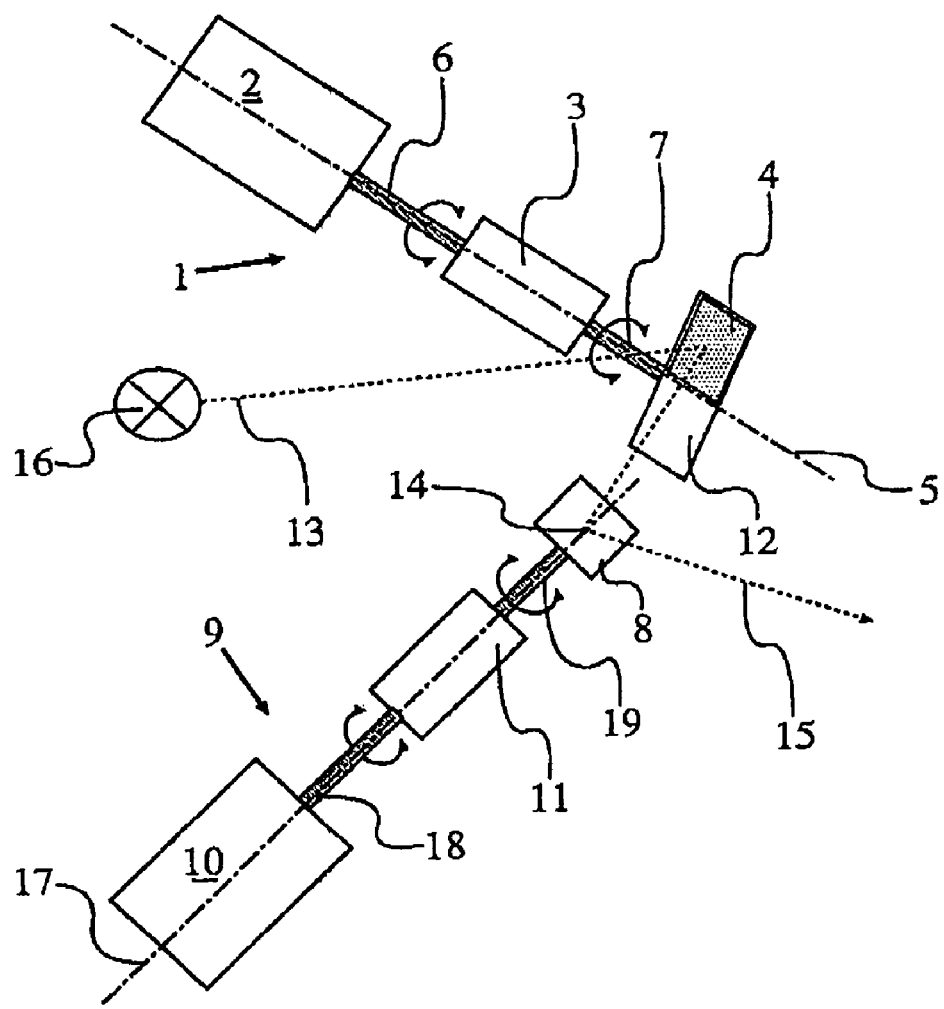
FIG. 2 shows, in a schematic depiction, a second exemplary embodiment of an apparatus for beam deflection according to the present invention.

FIG. 2 shows, in addition to the apparatus for beam deflection of FIG. 1, a second mirror 8 that is alternatingly rotated by a second rotary drive 9. Mirror 8 is located after mirror 4 in the illumination beam path; mirror 8, rotated alternatingly by second rotary drive 9, deflects the light beam in a further direction. The second rotary drive 9 is embodied as a galvanometer, stepping motor or a resonant galvanometer.

Second rotary drive 9 also comprises a galvanometer 10 and a resonant galvanometer 11, and what has been stated previously applies correspondingly to mirror 8 and second rotary drive 9.

The deflection direction of mirror 8 is substantially perpendicular to the deflection direction of mirror 4. Mirror 4 executes a slow beam deflection, while mirror 8 executes a fast beam deflection.

A fast beam deflection that can be executed by resonant galvanometers 3, 11 involves a beam deflection frequency of 4000 Hz, the resonant frequency of the two resonant galvanometers. A slow beam deflection of the two galvanometers 2, 10 can be accomplished at a beam deflection frequency of 10 to 800 Hz. In the embodiment shown in FIG. 2, provision is also made for a fast beam deflection to be executed with mirror 4, and a slow beam deflection with mirror 8. It is thereby advantageously possible to transpose the "fast" scanning or imaging direction.

To minimize distortions and to allow the use of small mirrors, mirror 4 is embodied as a paddle scanner. Mirror 4 comprises a baseplate 12 that is only partially mirror-coated. Baseplate 4 is adhesively bonded, symmetrically with respect to rotation axis 5, onto shaft 7 of resonant galvanometer 3. Regardless of the particular angular position of mirror 4, light beam 13 striking mirror 4 is almost always reflected onto the same point 14 on mirror 8, so that light beam 15 reflected from the two mirrors appears to rotate in two directions about virtual rotation point 14.

In conclusion, be it noted very particularly that the exemplary embodiments set forth above serve merely to describe the teaching claimed, but do not limit it to the exemplary embodiments. For example, one or both mirror arrangements (4, 8) have exactly one mirror. Additionally the first mirror 4 is configured as a paddle scanner.

What is claimed is:

1. An apparatus for beam deflection, in particular for scanning microscopy, comprises:
    a first mirror arrangement for deflecting a light beam; and
    a rotary drive (1) for alternatingly rotating the first mirror arrangement,
    wherein the rotary drive (1) has two mutually independent drive units (2, 3) for rotating the first mirror arrangement (4), together or mutually independently, about a rotation axis (5) defined by said rotary drive (1).

2. The apparatus as defined in claim 1, characterized in that the rotation axes of the two drive units (2, 3) are substantially parallel.

3. The apparatus as defined in claim 2, characterized in that the rotation axes of the two drive units (2, 3) are substantially identical.

4. The apparatus as defined in claim 1, characterized in that the first drive unit (2) defines a shaft (6) and the second drive unit (3) is mounted on the shaft (6) of the first drive unit (2) so that the second drive unit (3) is rotated by the first drive unit (2).

5. The apparatus as defined in claim 1, characterized in that the second drive unit (3) defines a shaft (7) and the mirror arrangement (4) is mounted on the shaft (7) of the second drive unit (3).

6. The apparatus as defined in claim 1, characterized in that fast beam deflection is accomplished with the second drive unit (3).

7. The apparatus as defined in claim 6, characterized in that the shaft (6) of the first drive unit (2) is blocked from rotating during operation of the second drive unit (3).

8. The apparatus as defined in claim 6, characterized in that the shaft (7) of the second drive unit (3) is blocked from rotating during operation of the first drive unit (2).

9. The apparatus as defined in claim 1, characterized in that a second mirror arrangement (8) is provided for deflection of the light beam in a further deflection direction, the second mirror arrangement (8) is positioned either before or after the first mirror arrangement (4) and a second rotary drive (9) is provided to rotate the second mirror arrangement (8).

10. The apparatus as defined in claim 9, characterized in that the deflection direction of the first mirror arrangement (4) is substantially perpendicular to the deflection direction of the second mirror arrangement (8).

11. The apparatus as defined in claim 9, characterized in that the first and the second mirror arrangement (4, 8) respectively executes a slow and fast beam deflection.

12. The apparatus as defined in claim 11, characterized in that a fast beam deflection lies in the range from 100 Hz to 10,000 Hz.

13. The apparatus as defined in claim 11, characterized in that a slow beam deflection lies in the range from 0.1 Hz to 800 Hz.

14. The apparatus as defined in claim 9, characterized in that a shared mount is provided and at least one of the mirror arrangements has at least two mirrors, which are received in the shared mount.

15. The apparatus as defined in claim 9, characterized in that one or both mirror arrangements (4, 8) have exactly one mirror.

16. An scanning microscope comprises:
    an apparatus for beam deflection, wherein the apparatus for beam deflection has a first mirror arrangement for deflecting a light beam; and
    a rotary drive (1) for alternatingly rotating the first mirror arrangement,
    wherein the rotary drive (1) has two mutually independent drive units (2, 3) for rotating the first mirror arrangement (4), together or mutually independently, about a rotation axis (5) defined by said rotary drive (1).

17. The scanning microscope as defined in claim 16, characterized in that the rotation axes of the two drive units (2, 3) are substantially parallel.

18. The scanning microscope as defined in claim 17, characterized in that the rotation axes of the two drive units (2, 3) are substantially identical.

19. The scanning microscope as defined in claim 16, characterized in that the first drive unit (2) defines a shaft (6) and the second drive unit (3) is mounted on the shaft (6) of the first drive unit (2) so that the second drive unit (3) is rotated by the first drive unit (2).

20. The scanning microscope as defined in claim 16, characterized in that the second drive unit (3) defines a shaft (7) and the mirror arrangement (4) is mounted on the shaft (7) of the second drive unit (3).

21. The scanning microscope as defined in claim 16, characterized in that fast beam deflection is accomplished with the second drive unit (3).

22. The scanning microscope as defined in claim 21, characterized in that the shaft (6) of the first drive unit (2) is blocked from rotating during operation of the second drive unit (3).

23. The scanning microscope as defined in claim 21, characterized in that the shaft (7) of the second drive unit (3) is blocked from rotating during operation of the first drive unit (2).

24. The scanning microscope as defined in claim 16, characterized in that a second mirror arrangement (8) is provided for deflection of the light beam in a further deflection direction, the second mirror arrangement (8) is positioned either before or after the first mirror arrangement (4) and a second rotary drive (9) is provided to rotate the second mirror arrangement (8).

25. The scanning microscope as defined in claim 24, characterized in that the deflection direction of the first mirror arrangement (4) is substantially perpendicular to the deflection direction of the second mirror arrangement (8).

26. The scanning microscope as defined in claim 24, characterized in that the first and the second mirror arrangement (4, 8) respectively executes a slow and fast beam deflection.

27. The scanning microscope as defined in claim 26, characterized in that a fast beam deflection lies in the range from 100 Hz to 10,000 Hz.

28. The scanning microscope as defined in claim 26, characterized in that a slow beam deflection lies in the range from 0.1 Hz to 800 Hz.

29. The scanning microscope as defined in claim 24, characterized in that a shared mount is provided and at least one of the mirror arrangements has at least two mirrors, which are received in the shared mount.

30. The scanning microscope as defined in claim 24, characterized in that one or both mirror arrangements (4, 8) have exactly one mirror.

* * * * *